F. Wright,
Piston-Rod Packing.
Nº 56,658. Patented July 24, 1866.
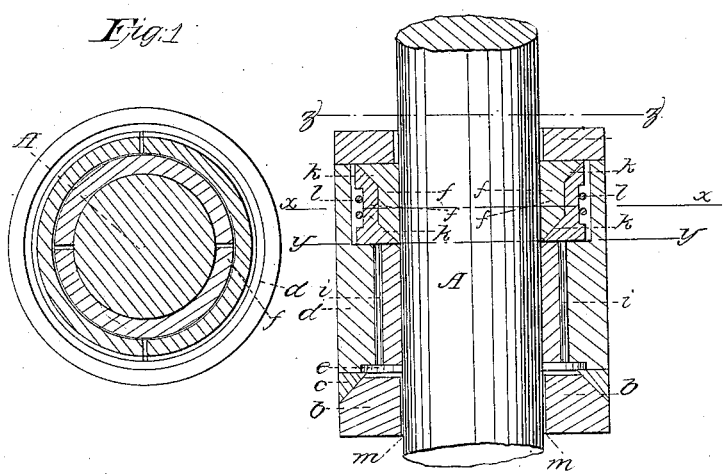
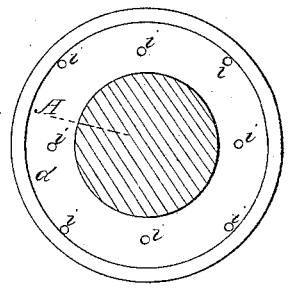
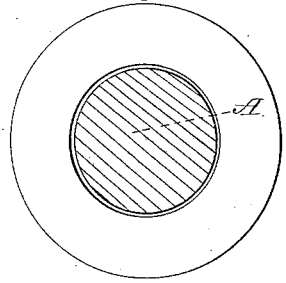
Witnesses
J. W. B. Carrington
Wm. Trewin
Inventor:
Francis Wright
Per Munn & Co.
Attorneys

UNITED STATES PATENT OFFICE.

FRANCIS WRIGHT, OF GALESBURG, ILLINOIS.

IMPROVEMENT IN PISTON-ROD PACKINGS.

Specification forming part of Letters Patent No. 56,658, dated July 24, 1866.

*To all whom it may concern:*

Be it known that I, FRANCIS WRIGHT, of Galesburg, Knox county, State of Illinois, have invented a new and Improved Steam-Packing; and I do hereby declare that the following is a full, clear, and exact description thereof, which will enable others skilled in the art to make and use the same, reference being had to the accompanying drawings, forming part of this specification, in which—

Figure 1 represents a horizontal section of this invention, the line $x\ x$, Fig. 2, indicating the plane of section. Fig. 2 is a longitudinal central section of the same. Fig. 3 is a horizontal section of the same, the plane of section being indicated by the line $y\ y$, Fig. 2, the packing-rings having been removed. Fig. 4 is a similar section of the same, taken in the plane indicated by the line $z\ z$, Fig. 2.

Similar letters of reference indicate like parts.

This invention relates to a packing which is intended particularly for piston-rods of steam-engines.

It consists of a sleeve which is provided with a recess at its inner end to form a steam-chamber, and with another recess at its outer end to receive two sets of packing-rings fitted together with inclined planes, in combination with steam-channels extending from the steam-chamber to the recess containing the packing-rings, and with a beveled lead gasket which is supported by the inclined edge of a suitable bushing, and which surrounds the steam-chamber in such a manner that by the action of the steam itself a tight joint is produced on the inner surface of the stuffing-box, and also on the piston-rod, and a packing is obtained which requires little attention and which works with the least possible loss by friction.

A represents the piston-rod of a steam-engine, which passes through the stuffing-box in the cylinder-head in the usual manner. In the bottom of the stuffing-box I place a bushing, $b$, which fits loosely on the piston-rod, and the outer edge of which is beveled off to receive the lead gasket $c$. On this gasket rests the sleeve $d$, which is provided with a recess at both ends, the recess at the inner end to form the steam-chamber $e$ and the recess at the outer end to receive the packing-rings $f$.

Two sets of packing-rings are used, which are provided each with two inclined planes, $r$, as shown, so that by the action of the follower $g$ and by the pressure of the steam the inner rings are pressed up against the piston-rod, and a tight joint is produced.

A suitable ring, $l$, may be applied to keep the packing-rings in position, if the same are not exposed to the pressure of the steam.

Steam passes from the interior of the cylinder to the chamber $e$ through the spaces $m$ between the piston-rod A and collar $b$, and this chamber communicates, through a series of channels, $i$, with the recess containing the packing-rings, said channels being made through the sleeve $d$, as shown in Figs. 2 and 3. The steam also acts on the gasket, and keeps the same in close contact with the inner surface of the stuffing-box, and by these means the escape of steam is effectually prevented.

The whole packing is inclosed in the stuffing-box and held in place by the gland in the usual manner. A cheap, durable, and reliable steam-packing is thus obtained, which can be easily adjusted and which works with the least possible friction.

What I claim as new, and desire to secure by Letters Patent, is—

1. The gasket $c$, in combination with the bushing $b$, sleeve $d$, and steam-chamber $e$, constructed and operating substantially as and for the purpose described.

2. The steam-chamber $e$ and channels $i$, in combination with the packing-rings $f$, sleeve $d$, and follower $g$, constructed and operating substantially as and for the purpose set forth.

3. The double-inclined packing-rings $f$, as and for the purpose described.

The above specification of my invention signed by me this 20th day of February, 1866.

FRANCIS WRIGHT.

Witnesses:
M. D. COOKE,
F. BURSON, M. D.